(12) United States Patent
Brocas et al.

(10) Patent No.: US 11,453,735 B2
(45) Date of Patent: Sep. 27, 2022

(54) WATER-SOLUBLE COPOLYMER COMPOSITION WITH NEUTRAL PH

(71) Applicant: Arkema France, Colombes (FR)

(72) Inventors: Anne-Laure Brocas, Peyrehorade (FR); Sylvie Cazaumayou, Dax (FR); Sylvain Bourrigaud, Morlanne (FR); Guillaume Decrevoisier, Boulogne Billancourt (FR)

(73) Assignee: Arkema France, Colombes (FR)

( * ) Notice: Subject to any disclaimer, the term of this patent is extended or adjusted under 35 U.S.C. 154(b) by 186 days.

(21) Appl. No.: 16/766,926

(22) PCT Filed: Nov. 23, 2018

(86) PCT No.: PCT/FR2018/052966
§ 371 (c)(1),
(2) Date: May 26, 2020

(87) PCT Pub. No.: WO2019/106265
PCT Pub. Date: Jun. 6, 2019

(65) Prior Publication Data
US 2020/0369808 A1    Nov. 26, 2020

(30) Foreign Application Priority Data
Nov. 28, 2017  (FR) ...................... 1761283

(51) Int. Cl.
*C08F 220/06*  (2006.01)
*C08F 212/08*  (2006.01)
(Continued)

(52) U.S. Cl.
CPC .............. *C08F 220/06* (2013.01); *B33Y 70/00* (2014.12); *C08F 212/22* (2020.02);
(Continued)

(58) Field of Classification Search
CPC ........................... C08F 220/06; C08F 212/08
See application file for complete search history.

(56) References Cited

U.S. PATENT DOCUMENTS 3,928,273 A   12/1975  Chang et al.
8,822,590 B2  9/2014   Hermes et al.
(Continued)

FOREIGN PATENT DOCUMENTS

DE   19640208 A1   4/1998
EP    2041192 A1   4/2009
(Continued)

OTHER PUBLICATIONS

International Search Report and Written Opinion for International Application No. PCT/FR2018/0052966, dated Mar. 14, 2019, 8 pages.

*Primary Examiner* — Catherine S Branch
(74) *Attorney, Agent, or Firm* — RatnerPrestia

(57) ABSTRACT

The present invention relates to the field of copolymers which are water-soluble or water-dispersible at neutral pH or near-neutral pH, that is to say between 5.5 and 9.5, comprising at least one random copolymer comprising methacrylic acid, butyl acrylate, styrene and a monomer chosen from styrenesulfonic acid or salts thereof, vinylbenzoic acid or salts thereof, 2-acrylamido-2-methanesulfonic acid or salts thereof, N-vinylpyrrolidone, alone or in combination.

10 Claims, 1 Drawing Sheet

(51) Int. Cl.
 *B33Y 70/00* (2020.01)
 *C08F 212/14* (2006.01)
(52) U.S. Cl.
 CPC ........ *C08F 212/30* (2020.02); *C08F 2438/01* (2013.01); *C08F 2438/02* (2013.01); *C08F 2438/03* (2013.01)

(56) References Cited

U.S. PATENT DOCUMENTS

| | | |
|---|---|---|
| 10,308,743 B2 | 6/2019 | Ruggieri et al. |
| 2021/0206960 A1* | 7/2021 | Michl .................... C08L 33/08 |

FOREIGN PATENT DOCUMENTS

| | | |
|---|---|---|
| EP | 2447292 A1 | 5/2012 |
| EP | 2699611 A1 | 2/2014 |
| WO | 2015175682 A1 | 11/2015 |

* cited by examiner

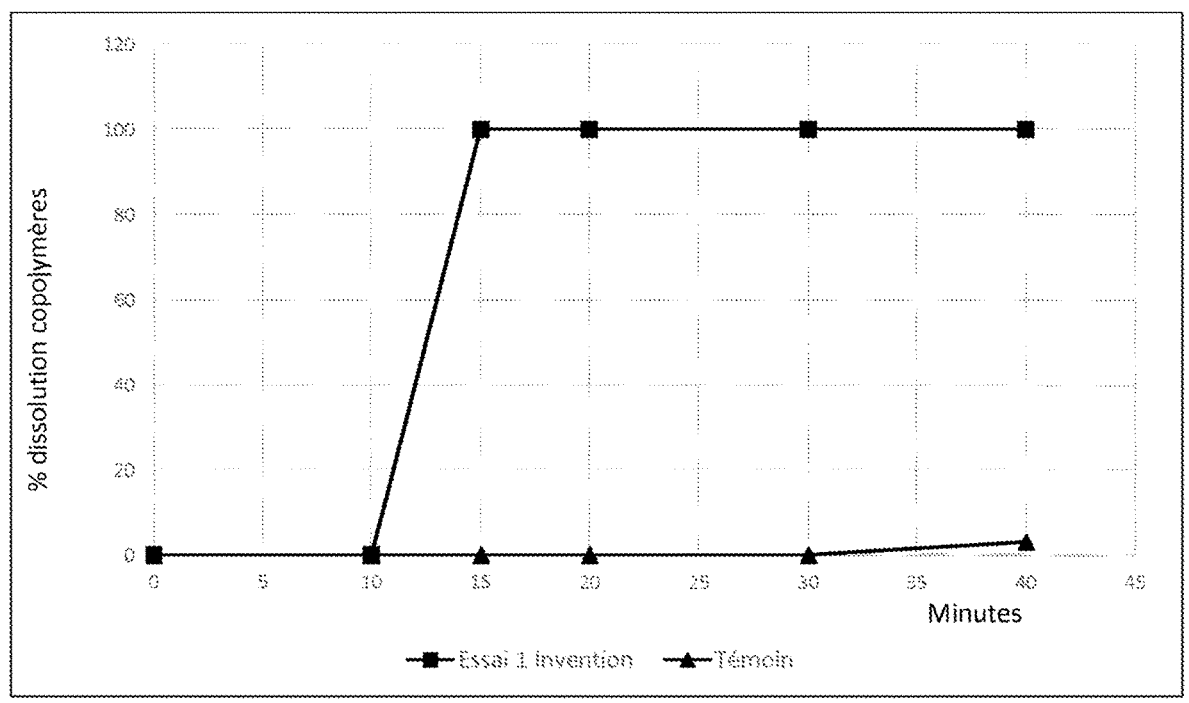

WATER-SOLUBLE COPOLYMER COMPOSITION WITH NEUTRAL PH

CROSS-REFERENCE TO RELATED APPLICATIONS

This is the national phase of International Application No. PCT/FR2018/052966, filed 23 Nov. 2018, which claims priority to French Application No. 1761283, filed 28 Nov. 2017. The disclosure of each of these applications is incorporated herein by reference in its entirety for all purposes.

FIELD OF THE INVENTION

The present invention relates to the field of copolymers which are water-soluble or water-dispersible at neutral pH or near-neutral pH, that is to say between 5.5 and 9.5, comprising at least one random copolymer comprising methacrylic acid, butyl acrylate, styrene and a monomer chosen from styrenesulfonic acid or salts thereof, vinylbenzoic acid or salts thereof, 2-acrylamido-2-methanesulfonic acid or salts thereof, N-vinylpyrrolidone, alone or in combination.

Such copolymers solubilize or disperse more rapidly in water at neutral pH or near-neutral pH than copolymers known from the prior art.

This invention is valued in various uses of these copolymers as dispersing agents for pigments, as rheology modifiers in applications as diverse as drilling muds, textile printing pastes, the cosmetics industry, or else the detergents industry, coatings such as paint, anti-settling and/or suspending agents for coarse mineral or organic fillers, for example in phytosanitary applications, but especially in three-dimensional printing (or 3D printing) of an object and more particularly as sacrificial materials of fused deposition modeling.

Regarding more particularly the field of three-dimensional printing (or 3D printing), this technology allows the additive manufacturing (or AM) of a real object from a virtual object. It is based on cutting the 3D virtual object into 2D slices of very thin thickness. These thin slices are deposited one by one by fixing them onto the preceding slices, thereby reconstituting the real object. Among the constituent materials of the object are plastics (in particular acrylonitrile-butadiene-styrene (or ABS) and polylactic acid (or PLA)), wax, metal or ceramics. Examples of additive techniques are fused deposition modeling (or FDM) and laser sintering.

Fused deposition modeling is a mechanical technique which consists in melting a filament of synthetic material (generally plastic of ABS or PLA type) through an extrusion nozzle heated to a temperature ranging between 160 and 270° C. A molten filament, with a diameter of the order of a tenth of a millimetre, emerges from said nozzle. This yarn is deposited online and bonds by remelting onto that which has been deposited previously. This technique makes it possible to create parts made of proper material, which have mechanical and thermal characteristics and a stability that are identical to injection-molded thermoplastic parts. This technique also has a major advantage concerning the support structure required for the production of the parts, since this construction support usually consists of a material other than that which constitutes the created object, said material being removed from said object when the process for constructing said object is finished.

The construction support is generally a water-soluble or water-dispersible polymer composition corresponding to very precise specifications. Among the desired properties, in addition to the mechanical strength, the glass transition temperature of the polymer, its thermal stability or its ease of use, the water-solubilization or water-dispersibilty kinetics are of primary importance.

TECHNICAL BACKGROUND

EP 2447292, EP2699611 and EP 2041192 describe water-dispersible soluble compositions or copolymers used in the field of 3D printing.

These compositions consist of random copolymers comprising monomers such as maleic anhydride (EP 2699611), methacrylic acid (EP 2041192), more generally unsaturated α,β-monocarboxylic acids (EP 2447292) polymerized by radical polymerization. WO2015175682 describe a copolymer comprising neutralized carboxylic groups which is soluble in an alkaline aqueous solution.

However, such compositions have water-solubilization or water-dispersibility kinetics which are again too slow, what is more at neutral pH. Increasing the proportion of hydrophilic monomers could constitute a solution, but in this case, other important characteristics, such as the Tg, the thermal stability, the melt flow index or else the mechanical properties, are degraded.

The applicant has now discovered that a composition comprising a random copolymer comprising methacrylic acid, butyl acrylate, styrene and a judiciously chosen hydrophilic additional monomer exhibits a much faster dissolution or dispersibility at neutral pH or near-neutral pH, that is to say between 5.5 and 9.5, than the compositions known from the prior art.

SUMMARY OF THE INVENTION

The invention thus relates to a composition comprising a random copolymer comprising the following monomers:
styrene, from 1 to 45% by weight, limits included;
methacrylic acid, from 35 to 45% by weight, limits included;
butyl acrylate, from 15 to 35% by weight, limits included;
a monomer chosen from styrenesulfonic acid or salts thereof, vinylbenzoic acid or salts thereof, 2-acrylamido-2-methanesulfonic acid or salts thereof, N-vinylpyrrolidone, alone or in combination, in proportions of from 1 to 45%, limits included.

DETAILED DESCRIPTION

The term "water-solubilization or water-dispersibility" is intended to mean a solublization or a dispersibility in an aqueous phase of which the pH is between 5.5 and 9.5, in a temperature range of between 40 and 70° C.

A polymer is said to be "dispersible" if it forms, at a concentration of 5% by weight in a solvent, at 25° C., a stable suspension of fine, generally spherical, particles. The average size of the particles constituting said dispersion is less than 1 µm and, more generally, ranges between 5 and 400 nm, preferably from 10 to 250 nm by weight. These particle sizes are measured by light scattering.

When the solvent is water, the term used is "water-dispersible" polymer.

The copolymers of the invention can be prepared by radical polymerization or by controlled radical polymerization. When it is a question of obtaining a water-soluble or water-dispersible copolymer, the applicant notes, however, that it is preferable to use controlled radical polymerization and that the copolymer thus prepared is more rapidly solubilized or dispersed in an aqueous solution.

To this effect, use may be made of any type of controlled radical polymerization in the context of the invention, such as NMP ("Nitroxide Mediated Polymerization"), RAFT ("Reversible Addition and Fragmentation Transfer"), ATRP ("Atom Transfer Radical Polymerization"), INIFERTER ("Initiator-Transfer-Termination"), RITP ("Reverse Iodine Transfer Polymerization") or ITP ("Iodine Transfer Polymerization").

According to a preferred embodiment of the invention, the copolymers are prepared by nitroxide mediated polymerization (NMP).

More particularly, the nitroxides resulting from the alkoxyamines derived from the stable free radical (1) are preferred.

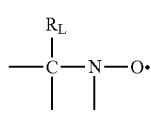

(1)

wherein the radical $R_L$ has a molar mass of greater than 15.0342 g/mol. The radical $R_L$ may be a halogen atom such as chlorine, bromine or iodine, a saturated or unsaturated, linear, branched or cyclic, hydrocarbon-based group, such as an alkyl or phenyl radical, or an ester group —COOR or an alkoxyl group —OR or a phosphonate group —PO(OR)$_2$, as long as it has a molar mass of greater than 15.0342. The monovalent radical $R_L$ is said to be in the β position relative to the nitrogen atom of the nitroxide radical. The remaining valences of the carbon atom and of the nitrogen atom in formula (1) can be bonded to various radicals, such as a hydrogen atom or a hydrocarbon-based radical, for instance an alkyl, aryl or arylalkyl radical, comprising from 1 to 10 carbon atoms. It is not excluded for the carbon atom and the nitrogen atom in formula (1) to be connected together via a divalent radical, so as to form a ring. Preferably, however, the remaining valences of the carbon atom and of the nitrogen atom of formula (1) are bonded to monovalent radicals. Preferably, the radical $R_L$ has a molar mass of greater than 30 g/mol. The radical $R_L$ may, for example, have a molar mass of between 40 and 450 g/mol. By way of example, the radical $R_L$ may be a radical comprising a phosphoryl group, it being possible for said radical $R_L$ to be represented by the formula:

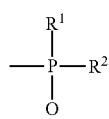

(2)

wherein $R^1$ and $R^2$, which may be identical or different, may be chosen from alkyl, cycloalkyl, alkoxyl, aryloxyl, aryl, aralkyloxyl, perfluoroalkyl or aralkyl radicals and may comprise from 1 to 20 carbon atoms. $R^3$ and/or $R^4$ can also be a halogen atom, such as a chlorine or bromine or fluorine or iodine atom. The radical $R_L$ may also comprise at least one aromatic ring, such as for the phenyl radical or the naphthyl radical, it being possible for said ring to be substituted, for example with an alkyl radical comprising from 1 to 4 carbon atoms.

More particularly, the alkoxyamines derived from the following stable radicals are preferred:
N-(tert-butyl)-1-phenyl-2-methylpropyl nitroxide,
N-(tert-butyl)-1-(2-naphthyl)-2-methylpropyl nitroxide,
N-(tert-butyl)-1-dibenzylphosphono-2,2-dimethylpropyl nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphono-1-methylethyl nitroxide,
4-oxo-2,2,6,6-tetramethyl-1-piperidinyloxy,
2,4,6-tri-tert-butylphenoxy nitroxide,
N-(tert-butyl)-1-diethylphosphono-2,2-dimethylpropyl nitroxide.

The alkoxyamines used in controlled radical polymerization must allow good control of the linking of the monomers. Thus, they do not all allow good control of certain monomers. For example, the alkoxyamines derived from TEMPO make it possible to control only a limited number of monomers; the same is true for the alkoxyamines derived from 2,2,5-trimethyl-4-phenyl-3-azahexane-3-nitroxide (TIPNO). On the other hand, other alkoxyamines derived from nitroxides corresponding to formula (1), particularly those derived from nitroxides corresponding to formula (2) and even more particularly those derived from N-(tert-butyl)-1-diethylphosphono-2,2-dimethylpropyl nitroxide, make it possible to broaden the controlled radical polymerization of these monomers to a large number of monomers. In addition, the alkoxyamine opening temperature also influences the economic factor. The use of low temperatures will be preferred in order to minimize industrial difficulties. The alkoxyamines derived from nitroxides corresponding to formula (1), particularly those derived from nitroxides corresponding to formula (2) and even more particularly those derived from N-(tert-butyl)-1-diethylphosphono-2,2-dimethylpropyl nitroxide, will therefore be preferred to those derived from TEMPO or 2,2,5-trimethyl-4-phenyl-3-azahexane-3-nitroxide (TIPNO).

The weight proportion of the monomers is chosen in the following ranges:
styrene, from 1 to 45% by weight, limits included, and preferably from 5 to 30%, limits included;
methacrylic acid, from 35 to 45% by weight, limits included, and preferably from 35 to 40%, limits included;
butyl acrylate, from 15 to 35% by weight, limits included, and preferably from 20 to 30%, limits included;
a monomer chosen from styrenesulfonic acid or salts thereof, vinylbenzoic acid or salts thereof, 2-acrylamido-2-methanesulfonic acid or salts thereof, or N-vinylpyrrolidone, alone or in combination, in proportions of from 1 to 45%, limits included, and preferably from 15 to 45%, limits included.

Preferably, the preferred monomer is styrenesulfonic acid or salts thereof.

The weight-average molecular weight of the water-soluble or water-dispersible copolymers which are a subject of the invention, measured by SEC, is between 30 000 g/mol and 300 000 g per mole, preferably between 70 000 and 170 000 g/mol, and more preferably between 80 000 and 130 000 g/mol.

The dispersity of the water-soluble or water-dispersible copolymers is less than 2.2 and preferably less than 2.

The glass transition temperature (Tg), measured by DMA (dynamic mechanical analysis), of the random copolymer present in the composition which is a subject of the invention is greater than 60° C. and preferably greater than 110° C.

The water-soluble or water-dispersible compositions which are a subject of the invention may contain impact modifiers, whether they are of the random copolymer or block copolymer type, or else core-shell particles, alone or in combination.

The compositions of the invention can be used as dispersing agents for pigments, or else as rheology modifiers in applications such as drilling muds, textile printing pastes, the cosmetics industry, or else the detergents industry, and other coating compositions such as paint, and as an antisettling and/or suspending agent for coarse mineral or organic fillers in the phytosanitary field, but also the field of three-dimensional printing (or 3D printing) of an object of the FDM (fused deposition molding) type as a sacrificial polymer. In this respect, the compositions of the invention can be formed in the form of an extruded filament, with or without impact modifiers, these extruded filaments also being a subject of the invention.

The invention also relates to the objects obtained by means of the compositions of the invention.

EXAMPLES

The mixture of reagents is the following:
Initiator: BlocBuilder® (from Arkema)
Styrene (St) (from Aldrich)
Methacrylic acid (MAA) (from Aldrich)
Sodium styrene sulfonate (from Aldrich)
Butyl acrylate (BuA) (from Aldrich)
Ethanol (from Aldrich)
Initiator: BlocBuilder® (from Arkema)
Styrene (St) (from Aldrich)
Methacrylic acid (MAA) (from Aldrich)
Sodium styrene sulfonate (from Aldrich)
Butyl acrylate (BuA) (from Aldrich)
Ethanol (from Aldrich)
Toluene (from Aldrich)
DMSO (dimethyl sulfoxide), (from Aldrich)

TABLE 1

|  | Control (g) | Test 1 invention (g) |
| --- | --- | --- |
| Initiator | 1.7 | 0.7 |
| Styrene | 149. | 30.5 |
| Methacrylic acid | 200 | 81.5 |
| Sodium styrene sulfonate | 0 | 30.5 |
| Butyl acrylate | 153 | 61.2 |
| Ethanol | 179 | 41 |
| Toluene | 119 | 41 |
| DMSO | 0 | 313 |
| Reactor temperature | 110-118° C. | 110-118° C. |

All of the reagents and solvents are introduced into a 2 l closed stainless steel reactor, under a nitrogen atmosphere. The mixture is heated for 180 minutes, with stirring at 200 rpm.

The final conversion is 71%. The copolymer of the invention is recovered by precipitation from acetone. For the control copolymer, the residual monomers and solvents are removed in an oven under vacuum at 100° C. In the 2 cases, the residue obtained is dried and then ground in a mortar so as to be used in powder form. The composition of the three copolymers is analyzed by $^1$H NMR and gives the following results as % by weight, table 2:

TABLE 2

|  | Control | Test 1 invention |
| --- | --- | --- |
| Styrene | 37 | 19 |
| Methacrylic acid | 40 | 36 |
| Sodium styrene sulfonate |  | 20 |
| Butyl acrylate | 23 | 25 |

Dissolution Tests

The copolymers obtained are heated to a temperature of 160° C. under a compression press so as to form a pellet 2.5 cm in diameter and 1 mm thick. The pellets are then placed in a beaker, with stirring, in water at pH 7 at a temperature of 60° C.

The samples are periodically removed and weighed in order to evaluate the weight loss linked to the dissolution of the polymer. The tests are carried out at a pH of 7 at 60° C.; table 1:

TABLE 3

| Time | % Weight loss pH 7 | |
| --- | --- | --- |
| (min) | Test 1 Invention | Control |
| 0 | 0 | 0 |
| 10 | 0 | 0 |
| 15 | 100 | 0 |
| 20 | 100 | 0 |
| 30 | 100 | 0 |
| 40 | 100 | 3 |

FIG. 1 shows the dissolution of the control copolymer and of the copolymer of the invention (test 1) at pH=7 and 60° C.

It is noted that the copolymers prepared using the four monomers Abu/STY/AMA/sodium styrene sulfonate (Invention) dissolve more rapidly than those prepared without sodium styrene sulfonate.

The invention claimed is:

1. A composition comprising a random copolymer, where the random copolymer comprises the following monomers:
   1 to 45% by weight of styrene, limits included;
   35 to 45% by weight of methacrylic acid, limits included;
   15 to 35% by weight of butyl acrylate, limits included;
   1 to 45% of a monomer chosen from styrenesulfonic acid or salts thereof, vinylbenzoic acid or salts thereof, 2-acrylamido-2-methanesulfonic acid or salts thereof, N-vinylpyrrolidone, alone or in combination, limits included,
   wherein the weight % is relative to the total weight of the random copolymer, and
   wherein the random copolymer has a weight-average molecular weight of between 30,000 and 300,000 g/mol.

2. The composition as claimed in claim 1, wherein the random copolymer is prepared by controlled radical polymerization.

3. The composition as claimed in claim 1, wherein the glass transition temperature of the copolymer as measured by DMA is greater than 60° C.

4. The composition as claimed in claim 2, wherein the polymerization is carried out by RAFT controlled radical polymerization.

5. The composition as claimed in claim 2, wherein the polymerization is carried out by ATRP controlled radical polymerization.

6. The composition as claimed in claim 1, wherein the polymerization is carried out by NMP controlled radical polymerization.

7. The composition as claimed in claim 6, wherein the nitroxide from the NMP is from alkoxyamines derived from the stable radical of formula (1):

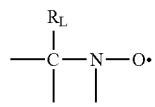

wherein $R_L$ has a molar mass of greater than 15.0342 g/mol.

8. The composition as claimed in claim 7, wherein the alkoxyamines are derived from the following stable radicals:
N-(tert-butyl)-1-phenyl-2-methylpropyl nitroxide,
N-(tert-butyl)-1-(2-naphthyl)-2-methylpropyl nitroxide,
N-(tert-butyl)-1-dibenzylphosphono-2,2-dimethylpropyl nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphono-1-methylethyl nitroxide,
4-oxo-2,2,6,6-tetramethyl-1-piperidinyloxy,
2,4,6-tri-tert-butylphenoxy nitroxide,
N-(tert-butyl)-1-diethylphosphono-2,2-dimethylpropyl nitroxide.

9. The composition as claimed in claim 8, wherein the alkoxyamines are derived from N-(tert-butyl)-1-diethylphosphono-2,2-dimethylpropyl nitroxide.

10. A filament extruded from a composition as claimed in claim 1.

* * * * *